(12) United States Patent
Sha et al.

(10) Patent No.: US 10,694,596 B2
(45) Date of Patent: Jun. 23, 2020

(54) POWER OUTPUT PARAMETER SELF-ADJUSTING SYSTEM HAVING IDENTIFIED LOAD

(71) Applicant: HEUVAN (CHONGQING) SCI-TECH CO., LTD., Chongqing (CN)

(72) Inventors: Yufeng Sha, Chongqing (CN); Kaifeng Tang, Chongqing (CN); Jinli He, Chongqing (CN)

(73) Assignee: HEUVAN (CHONGQING) SCI-TECH CO., LTD., Chongqing (CN)

( * ) Notice: Subject to any disclaimer, the term of this patent is extended or adjusted under 35 U.S.C. 154(b) by 0 days.

(21) Appl. No.: 16/346,128

(22) PCT Filed: Feb. 14, 2017

(86) PCT No.: PCT/CN2017/073495
§ 371 (c)(1),
(2) Date: Apr. 30, 2019

(87) PCT Pub. No.: WO2018/076574
PCT Pub. Date: May 3, 2018

(65) Prior Publication Data
US 2019/0281676 A1    Sep. 12, 2019

(30) Foreign Application Priority Data

Oct. 31, 2016    (CN) .......................... 2016 1 0927704

(51) Int. Cl.
*H05B 45/00*   (2020.01)
*H05B 45/14*   (2020.01)
*H05B 45/40*   (2020.01)

(52) U.S. Cl.
CPC ............. *H05B 45/00* (2020.01); *H05B 45/14* (2020.01); *H05B 45/40* (2020.01)

(58) Field of Classification Search
CPC ............ H05B 37/0272; H05B 33/0803; H05B 33/0809; H05B 33/0818; H05B 33/0821;
(Continued)

(56) References Cited

U.S. PATENT DOCUMENTS

| 2008/0074348 | A1 | 3/2008 | Kao | |
| 2011/0210675 | A1* | 9/2011 | Hamamoto | ............. F21S 8/031 315/185 R |
| 2011/0260648 | A1* | 10/2011 | Hamamoto | ........ H05B 33/0821 315/294 |

(Continued)

FOREIGN PATENT DOCUMENTS

| CN | 105764180 A | 7/2016 |
| CN | 106376142 A | 2/2017 |
| TW | 201108856 A1 | 3/2011 |

OTHER PUBLICATIONS

Texas Instruments; (LMx35, LMx35A Precision Temperature Sensors); Feb. 2015 (Year: 2015).*

*Primary Examiner* — Renan Luque
(74) *Attorney, Agent, or Firm* — Berggren LLP

(57) ABSTRACT

A power output parameter self-adjusting system having an identified load, including a variable parameter power and an identified load. The variable parameter power is electrically connected to the identified load; the variable parameter power comprises a power driving module and a power control module; the power driving module is electrically connected to the power control module; the identified load comprises a load and an identification module.

2 Claims, 3 Drawing Sheets

(58) Field of Classification Search
CPC .............. H05B 33/083; H05B 33/0842; H05B 33/0845; H05B 33/0851; H05B 33/0854; H05B 33/0857; H05B 33/0866; H05B 33/089; H05B 33/0896; H05B 37/0245; H05B 37/0254; H05B 37/0263; H05B 45/00; H05B 45/14; H05B 45/40; Y02B 20/48; Y02B 20/383; H04W 76/023; B64D 2203/00; B64D 47/06; F21K 9/20; F21K 9/23; F21K 9/232; F21S 2/005; F21S 8/026; F21S 8/035; F21V 21/096; F21V 23/00; F21V 23/008; F21V 23/0464; F21V 7/0008; F21Y 2101/00; F21Y 2103/10; F21Y 2105/10; F21Y 2115/10; G05B 15/02; G05B 19/042; G05B 2219/25387; G05B 2219/2642; G06Q 30/018; H01L 33/08; H01L 33/382; Y10T 307/944

See application file for complete search history.

(56) References Cited

U.S. PATENT DOCUMENTS

| | | | | |
|---|---|---|---|---|
| 2012/0187845 | A1* | 7/2012 | Saes | H05B 33/0818 315/113 |
| 2013/0169171 | A1* | 7/2013 | Kamizono | B60Q 11/005 315/185 R |
| 2013/0257272 | A1* | 10/2013 | Ishii | F21V 23/02 315/77 |
| 2014/0225517 | A1* | 8/2014 | Nam | H05B 33/0821 315/185 R |
| 2015/0351186 | A1* | 12/2015 | Dunser | H05B 33/0854 315/297 |
| 2016/0021712 | A1* | 1/2016 | Nakamura | H05B 33/0809 315/82 |
| 2016/0270177 | A1* | 9/2016 | Mishima | H05B 33/089 |
| 2018/0063907 | A1* | 3/2018 | Kambara | B60Q 1/0094 |
| 2018/0192489 | A1* | 7/2018 | Nakano | H01L 33/00 |

* cited by examiner

POWER OUTPUT PARAMETER SELF-ADJUSTING SYSTEM HAVING IDENTIFIED LOAD

PRIORITY

This application is a U.S national application of the international application number PCT/CN2017/073495 filed on 14 Feb. 2017, which claims priority of Chinese patent application CN201610927704.2 filed on Oct. 31, 2016, the contents of all of which are incorporated herein by reference.

TECHNICAL FIELD

The present disclosure relates to the field of LED driving power supply, particularly to a power supply output parameter self-adjusting system of an identified load (power output parameter self-adjusting system having identified load).

BACKGROUND ART

Conventional illumination technologies have shortcomings such as low lighting efficiency, high power consumption, and short service life, and LED lamps, with advantages such as long service life, energy saving, safety, and environmental friendliness, are rapidly replacing conventional illumination. Unlike common incandescent bulbs, an LED lamp cannot be directly connected with AC mains supplies of 220 V, but it needs to be provided with a constant output current by a driving power supply. The existing LED driving power supply is matched with the load (current, voltage) of a corresponding LED luminaire, with one kind of LED being corresponding to one kind of LED driving power supply, then a use scope is restricted, lacking universality, thus more LED driving power supplies are further developed, which more easily causes resource wasting.

SUMMARY

In view of this, an object of embodiments of the present disclosure is to provide a power supply output parameter self-adjusting system of an identified load, so as to solve the problem that the existing LED driving power supply, after being manufactured, is in one-to-one correspondence with a supplied load current, or with a supplied load voltage, while one power supply cannot be used to be connected with controllable LED loads having different currents and voltages for performing self-adjustment of output parameters.

A power supply output parameter self-adjusting system of an identified load provided in an embodiment of the present disclosure includes a variable parameter power supply and an identified load, wherein the variable parameter power supply is electrically connected with the identified load, the variable parameter power supply includes a power supply driving module and a power supply control module, the power supply driving module is electrically connected with the power supply control module, and the identified load includes a load and an identification module.

Preferably, the power supply control module includes a detection end and a signal output end, wherein the detection end is connected with the identification module, the signal output end is connected with the power supply driving module, and an output end of the power supply driving module is connected with the load; the power supply control module is configured to detect the identification module, and send a control signal to the power supply driving module according to a detection result, and the power supply driving module is configured to output a corresponding parameter according to the control signal.

Preferably, the identification module includes at least one switch branch, wherein each switch branch is in parallel connection with each other, one end of each of the switch branches is connected with a positive electrode of the output end of the power supply driving module, the other end of each of the switch branches is respectively connected with different detection ends of the power supply control module, and the power supply control module obtains different identification types of the identified load by detecting an on-off state of each of the switch branches.

Preferably, the identification module is a first detection resistor, wherein one end of the first detection resistor is connected with the positive electrode of the output end of the power supply driving module, and the other end of the first detection resistor is grounded after being connected with a first resistor, and a detection end of the power supply control module is connected between the first detection resistor and the first resistor.

Preferably, the power supply control module includes a detection end and a signal output end, wherein the detection end is connected with the identification module, the signal output end is connected with the power supply driving module, and the output end of the power supply driving module is connected with the load and the identification module respectively; the power supply control module is configured to detect the identification module, and send a control signal to the power supply driving module according to a detection result, and the power supply driving module is configured to output a corresponding parameter according to the control signal.

Preferably, the identification module includes a resistor module connected in parallel with the load.

Preferably, the resistor module is a second detection resistor, the load includes an input positive end and an output negative end, wherein one end of the second detection resistor is connected with the input positive end of the load, the other end of the second detection resistor is connected with the output negative end of the load, the input positive end of the load is further connected with the positive electrode of the output end of the power supply driving module, the output negative end of the load is further connected with a negative electrode of the output end of the power supply driving module, a first switch is provided between the output negative end of the load and the negative electrode of the output end of the power supply driving module, and a detection end of the power supply control module is connected between the output negative end of the load and the first switch.

Preferably, the load includes an input positive end and an output negative end, wherein one end of the resistor module is connected with the input positive end of the load, the other end of the resistor module is connected with the output negative end of the load, the input positive end of the load is further connected with the positive electrode of the output end of the power supply driving module, the power supply control module further includes a control end, the output negative end of the load is further connected with the control end, a second switch is provided between the output negative end of the load and the control end, and a detection end of the power supply control module is connected between the output negative end of the load and the second switch.

Preferably, the resistor module includes a first branch and at least one second branch, wherein the first branch is connected in parallel with the at least one second branch, all of the second branches are connected in parallel, the first branch includes a second resistor, each one of the at least one second branch includes a third resistor and a voltage stabilizing diode, a positive electrode of the voltage stabilizing diode is connected with the positive electrode of the output end of the power supply driving module, and a negative electrode of the voltage stabilizing diode is connected with the third resistor.

Preferably, the load is a controllable LED, configured for lighting and/or signal transmission, an input positive end of the controllable LED is connected with the positive electrode of the output end of the power supply driving module, and an output negative end of the controllable LED is connected with the negative electrode of the output end of the power supply driving module.

Compared with the prior art, the present disclosure has the following beneficial effects:

1. The power supply output parameter self-adjusting system of an identified load provided in the present disclosure includes the variable parameter power supply and the identified load, wherein the variable parameter power supply includes the power supply driving module and the power supply control module, the identified load includes the load and the identification module, after the load is connected with the variable parameter power supply, the identification module of the load can be detected by the power supply control module, and according to the detection result, automatic adjustment of parameters such as the output power of the power supply driving module is achieved, such that the power supply output parameter self-adjusting system of an identified load is automatically adapted to the load, without adjusting relevant output parameters of the power supply driving module after the load is manufactured, which is simple and convenient;

2. In the power supply output parameter self-adjusting system of an identified load in the present disclosure, the load is provided with the identification module, then automatic adjustment of parameters such as the output power of the power supply driving module is achieved by adding an identification module, without changing the original design, thus solving, all at once, the problem of adjusting the output of the power supply driving module according to the load, thereby saving more labors, decreasing product cost, and reducing resource wasting.

In order to make the above objects, features, and advantages of the present disclosure more apparent and understandable, preferred embodiments are particularly illustrated below in cooperation with attached accompanying drawings to make following detailed description.

BRIEF DESCRIPTION OF DRAWINGS

In order to more clearly illustrate technical solutions of embodiments of the present disclosure, accompanying drawings which are needed to be used in the embodiments will be introduced briefly below. It should be understood that the accompanying drawings below merely show some embodiments of the present disclosure, therefore, they should not be considered as limitation on the scope, and a person ordinarily skilled in the art still can obtain other relevant accompanying drawings according to these accompanying drawings, without using inventive effort.

Reference signs: 10—variable parameter power supply; 101—power supply driving module; 102—power supply control module; 1021—power supply control chip; 20—identified load; 201—load; 202—identification module; R01—first detection resistor; R02—second detection resistor; R03—resistor module; K4—first switch; Q1—second switch.

DETAILED DESCRIPTION OF EMBODIMENTS

The technical solutions in the embodiments of the present disclosure will be described clearly and completely below in conjunction with the accompanying drawings in the embodiments of the present disclosure. Apparently, the embodiments described are merely some embodiments of the present disclosure, rather than all embodiments. Generally, components in the embodiments of the present disclosure, as described and shown in the accompanying drawings herein, may be arranged and designed in various different configurations. Therefore, the following detailed description of the embodiments of the present disclosure provided in the accompanying drawings is not intended to limit the claimed scope of the present disclosure, but merely represents chosen embodiments of the present disclosure. All other embodiments obtained by a person skilled in the art based on the embodiments of the present disclosure without using inventive effort shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings. Meanwhile, in the description of the present disclosure, terms such as "first" and "second" are merely used for distinctive description, but should not be construed as indicating or implying importance in the relativity.

Figure 1:
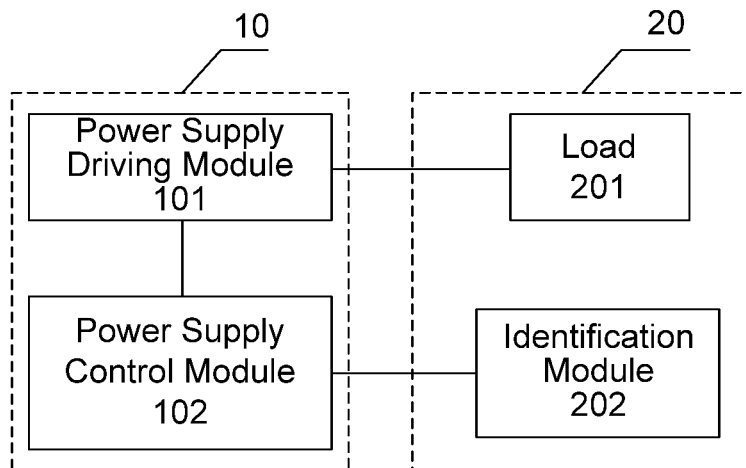
FIG. 1 is a structural block diagram illustrating a principle of a power supply output parameter self-adjusting system of an identified load according to an embodiment of the present disclosure.

Pleasing referring to FIG. 1, it is a structural block diagram illustrating a principle of a power supply output parameter self-adjusting system of an identified load according to an embodiment of the present disclosure. The power supply output parameter self-adjusting system of an identified load provided in the embodiment of the present disclosure includes a variable parameter power supply 10 and an identified load 20, wherein the variable parameter power supply 10 is electrically connected with the identified load 20, the variable parameter power supply 10 includes a power supply driving module 101 and a power supply control module 102, the power supply driving module 101 is electrically connected with the power supply control module 102, and the identified load 20 includes a load 201 and an identification module 202.

An output end of the power supply driving module 101, connected with the load 201, is configured to provide electricity to the load 201 in a driving mode with adjustable output parameters under the control of the power supply control module 102, the identification module 202 is configured to provide, according to different identification types, a basis for adjustment of the output parameters of the power supply driving module 101. The power supply control module 102 includes a detection end and a signal output end, wherein the identification module 202 is connected with the detection end, and the signal output end is connected with the power supply driving module 101; the power supply control module 102 is configured to detect the identification module 202 connected with the identified load 20, and send a control signal to the power supply driving module 101 according to a detection result, such that the power supply driving module 101 outputs a corresponding parameter, wherein the parameters may be current, voltage, power and so on.

Figure 2:
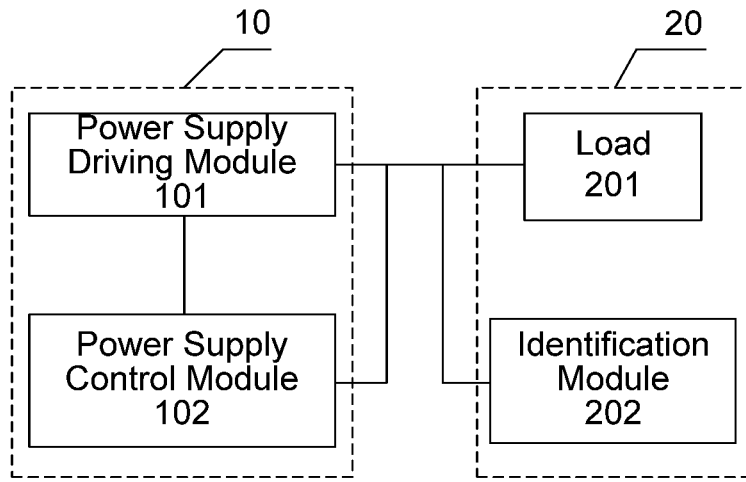
FIG. 2 is another structural block diagram illustrating the principle of the power supply output parameter self-adjusting system of an identified load according to an embodiment of the present disclosure.

Pleasing referring to FIG. 2, it is another structural block diagram illustrating the principle of the power supply output parameter self-adjusting system of an identified load according to the present disclosure. A working process of the power supply output parameter self-adjusting system of an identified load further may be as follows: the output end of the power supply driving module 101, connected with the load 201 and the identification module 202 respectively, is configured to provide electricity to the load 20 and the identification module 202 in a driving mode with adjustable output parameters under the control of the power supply control module 102. The identification module 202, connected with the output end of the power supply driving module 101, is configured to provide, according to different identification types, a basis for adjustment of the output parameters of the power supply driving module 101. The power supply control module 102 includes a detection end and a signal output end, wherein the identification module 202 is connected with the detection end, and the signal output end is connected with the power supply driving module 101; the power supply control module 102 is configured to detect the identification module 202 connected with the identified load 20, and send a control signal to the power supply driving module 101 according to a detection result, such that the power supply driving module 101 outputs corresponding parameters.

In the present embodiment, the load 201 is a controllable light-emitting diode (LED), configured for lighting and/or signal transmission, wherein an input positive end of the controllable LED is connected with the positive electrode of the output end of the power supply driving module 101, and an output negative end of the controllable LED is connected with a negative electrode of the output end of the power supply driving module 101. Evidently, in other specific embodiments, the load 201 also can be other light sources or other electric equipment.

The controllable LED in the present embodiment may be a single controllable LED, and also may be a light group consisting of a plurality of controllable LEDs.

In a practical using process, each parameter output by the power supply driving module 101 to the controllable LED is correspondingly adjusted according to a type of the controllable LED, different controllable LEDs require different output parameters of the power supply driving module 101, and the output parameters of the power supply driving module 101 include output voltage, output current, output power, output driving mode and so on.

The identification module 202 may be of different types, and different types of identification modules 202 are used to be corresponding to different controllable LEDs, for example, controllable LEDs requiring different output voltages, different output currents, different output powers, and different output driving modes, wherein the power supply control module 102 outputs to the power supply driving module 101 a control signal corresponding to each predetermined type of the identification module 202, and the power supply driving module 101 outputs different corresponding parameters upon receipt of different control signals. The type of the identification module 202 of the identified load 20 is detected by the detection end of the power supply control module 102, according to a detection result, the power supply control module 102 outputs a corresponding control signal to the power supply driving module 101, and the power supply driving module 101 outputs the output parameter corresponding to this type of identification module 202 after receiving the control signal, further achieving automatic adjustment of the output parameters of the power supply driving module 101, such that the power supply output parameter self-adjusting system of an identified load is automatically adapted to the load, without adjusting relevant output parameters of the power supply driving module 101 after the load is manufactured, which is simple and convenient.

Embodiment 1

Figure 3:
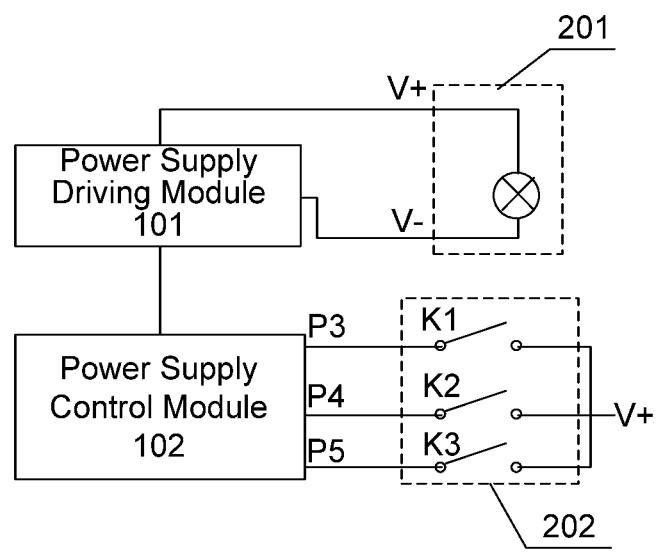
FIG. 3 is a structural schematic diagram of a circuit of the power supply output parameter self-adjusting system of an identified load according to Embodiment 1 of the present disclosure.

Pleasing refer to FIG. 3, it is a structural schematic diagram of a circuit of the power supply output parameter self-adjusting system of an identified load according to Embodiment 1 of the present disclosure. In an implementation of the power supply output parameter self-adjusting system of an identified load provided in the embodiment of the present disclosure, the identification module 202 includes at least one switch branch, all of the switch branches are in parallel connection with each other, one end of each of the switch branches is connected with a positive electrode of an output end of the power supply driving module 101, the other end of each of the switch branches is respectively connected with different detection ends of the power supply control module 102, and the power supply control module 102 obtains identification types of different identified loads 20 by detecting an on-off state of each switch branch.

A controllable LED is connected between a positive electrode and a negative electrode of the output end of the power supply driving module 101, a switch K1 has one end connected with the positive electrode of the output end of the power supply driving module 101, and the other end connected with a detection end P3 of the power supply control module 102, a switch K2 has one end connected with the positive electrode of the output end of the power supply driving module 101, and the other end connected with a detection end P4 of the power supply control module 102, and a switch K3 has one end connected with the positive electrode of the output end of the power supply driving module 101, and the other end connected with a detection end P5 of the power supply control module 102. Two states of each switch, on and off, are provided as two different signals "1" and "0" respectively. In the present embodiment, there are in total 8 combinations formed by the two types of different signals "1" and "0" of the switches K1, K2, and K3, wherein each combination corresponds to corresponding to the power supply control module 102 outputting a corresponding control signal to the power supply driving module 101, and the power supply driving module 101 outputs a type of parameter according to each corresponding signal combination of the switches.

For example, for a controllable LED requiring 8 types of different powers, 8 combinations corresponding to the switches respectively represent 8 types of powers, n1 to n8, the power supply control module 102 obtains one of the 8 combinations corresponding to the switches by detecting the on-off state of each switch branch, then the power supply control module 102 outputs, through a signal output end, a power control signal to the power supply driving module 101, with the power control signal corresponding to the detected on-off state combination of the switches and the power supply driving module 101, after receiving the power control signal, outputs a power corresponding to the on-off state combination of the switches, thus achieving an automatic adjustment of the output parameter of the power supply driving module 101.

In the present embodiment, the number of the switches illustrated is 3, and in practical use, the number of the switches can be set in a corresponding positive integer as required.

In the present embodiment, one end of each switch branch is connected with the positive electrode of the output end of the power supply driving module 101, and takes electricity from the positive electrode of the output end of the power supply driving module 101, but it does not mean that each switch branch is in parallel connection with the controllable LED, while each switch branch further can take electricity by means of the power supply control module 102.

In the present embodiment, the output power is taken as an example of the output parameter of the power supply driving module 101, and in practical use, the output parameter of the power supply driving module 101 can be replaced by other output parameters to perform self-adjustment.

Embodiment 2

Figure 4:
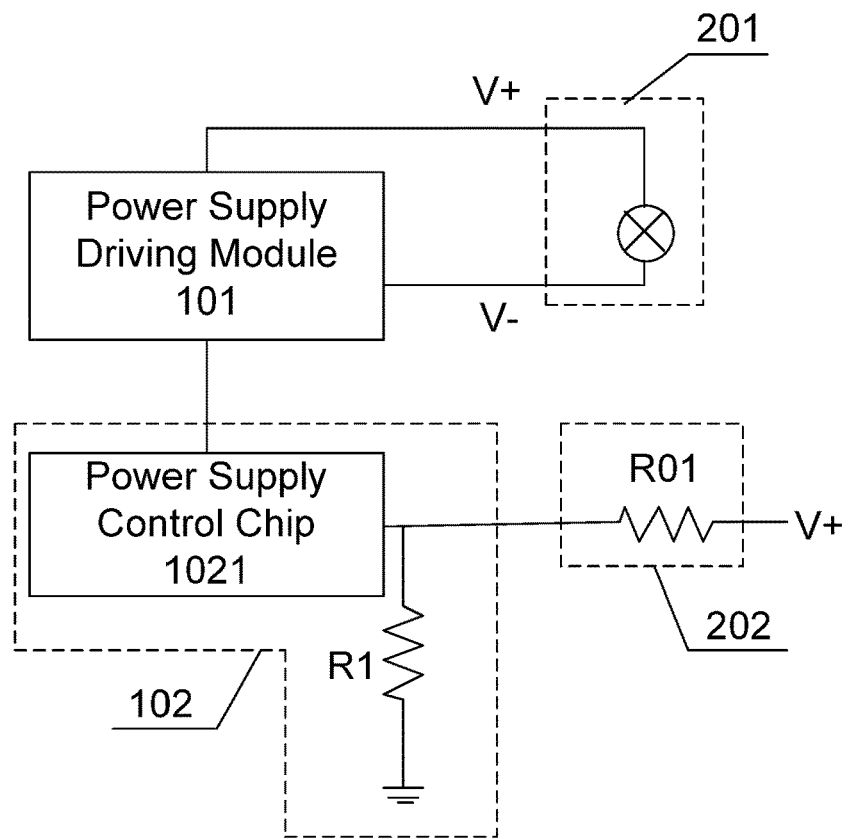
FIG. 4 is a structural schematic diagram of the circuit of the power supply output parameter self-adjusting system of an identified load according to Embodiment 2 of the present disclosure.

Pleasing refer to FIG. 4, it is a structural schematic diagram of a circuit of a power supply output parameter self-adjusting system of an identified load according to Embodiment 2 of the present disclosure. For the power supply output parameter self-adjusting system of an identified load provided in the embodiment of the present disclosure, the power supply control module 102 includes a first resistor R1 and a power supply control chip 1021, the identification module is a first detection resistor R01, wherein one end of the first detection resistor R01 is connected with a positive electrode of an output end of the power supply driving module 101, and the other end of the first detection resistor R01 is grounded after being connected with the first resistor R1, and a detection end of the power supply control chip 1021 is connected between the first detection resistor R01 and the first resistor R1, wherein the first resistor R1 is a protective resistor.

In a practical using process, different resistance values of the first detection resistor R01 serving an identification function represent different identification types. A resistance value or a voltage value or a current value of the first detection resistor R01 of the identified load 20 is detected by means of the detection end of the power supply control chip 1021. According to a detection result, the power supply control chip 1021 outputs a corresponding control signal to the power supply driving module 101. After receiving the control signal, the power supply driving module 101 outputs an output parameter corresponding to the first detection resistor R01 of the identification module 202 with this resistance value.

For example, for a controllable LED with n types of different constant current sources, when the resistance value of the first detection resistor R01 is a1, the power supply driving module 101 outputs a current b1, when the resistance value of the first detection resistor R01 is a2, the power supply driving module 101 outputs a current b2, when the resistance value of the first detection resistor R01 is a3, the power supply driving module 101 outputs a current b3, and when the resistance value of the first detection resistor R01 is an, the power supply driving module 101 outputs a current bn. When the resistance value or the voltage value or the current value of the first detection resistor R01 of the identified load 20 detected by the detection end of the power supply control chip 1021 is a value corresponding to a1, according to the detection result, the power supply control chip 1021 outputs a corresponding control signal to the power supply driving module 101, and after receiving the control signal, the power supply driving module 101 outputs to the controllable LED the output current b1 corresponding to the first detection resistor R01 of the identification module 202 with this resistance value, so as to achieve an automatic adjustment of the output current of the power supply driving module 101.

In the present embodiment, one end of the first detection resistor R01 is connected with the positive electrode of the output end of the power supply driving module 101, and takes electricity from the positive electrode of the output end of the power supply driving module 101, but it does not mean that the first detection resistor R01 is in parallel connection with the controllable LED, and the one end of the first detection resistor R01 further can take electricity by means of the power supply control module 102.

In the present embodiment, the output current is taken as an example of the output parameter of the power supply driving module 101, and in practical use, the output parameter of the power supply driving module 101 can be replaced by other output parameters to perform self-adjustment.

Embodiment 3

Figure 5:
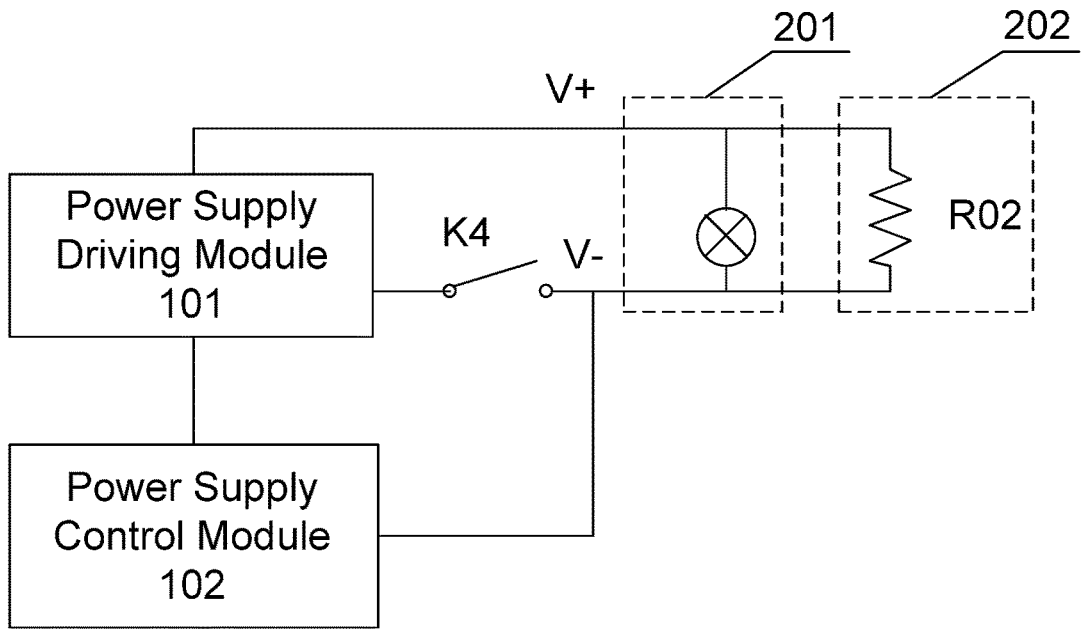
FIG. 5 is a structural schematic diagram of the circuit of the power supply output parameter self-adjusting system of an identified load according to Embodiment 3 of the present disclosure.

Pleasing refer to FIG. 5, it is a structural schematic diagram of a circuit of a power supply output parameter self-adjusting system of an identified load according to Embodiment 3 of the present disclosure. For the power supply output parameter self-adjusting system of an identified load provided in the embodiment of the present disclosure, the identification module 202 includes a second detection resistor R02 connected in parallel with the load 201; one end of the second detection resistor R02 is connected with an input positive end of the load 201, the other end of the second detection resistor R02 is connected with an output negative end of the load 201, a first switch K4 is provided between the output negative end of the load 201 and an output negative electrode of the power supply driving module 101, and a detection end of the power supply control module 102 is connected between the output negative end of the load and the first switch K4.

A working process of the present embodiment is as follows: presence of the second detection resistor R02 or a voltage or a current at the output negative end is detected by the detection end of the power supply control module 102, the power supply control module 102 outputs a corresponding control signal to the power supply driving module 101 according to a detection result, after receiving the control signal, the power supply driving module 101 outputs two states (types) of the second detection resistor R02, presence or absence, or outputs an output parameter corresponding to the identification module 202 detecting a voltage or current type at the output negative end.

In a first example, for a controllable LED having two different driving modes, when the second detection resistor R02 is provided, the controllable LED is driven in a mode with a constant voltage source, and when the second detection resistor R02 is absent, the controllable LED is driven in a mode with a constant current source. A working process that the detection end of the power supply control module 102 detects the presence of the second detection resistor R02 is as follows: after a first switch K4 is switched on, if the second detection resistor R02 is present, a voltage detected by the detection end of the power supply control module 102 is in a state with a relatively high level, and if the second detection resistor R02 is absent, the voltage detected by the detection end of the power supply control module 102 is in a state with a relatively low level. When the detection end of the power supply control module 102 detects is the presence of the second detection resistor R02, the power supply control module 102 outputs a corresponding control signal to the power supply driving module 101 according to a detection result, after receiving the control signal, the power supply driving module 101 outputs a driving mode with a constant voltage source, with the driving mode corresponding to an identification type of the presence of the second detection resistor R02; when the detection end of the power supply control module 102 fails to detect the presence of the second detection resistor R02, the power supply control module 102 outputs a corresponding control signal to the power supply driving module 101 according to a detection result, after receiving the control signal, the power supply driving module 101 outputs a driving mode with a constant current source, with the driving mode corresponding to an identification type of the absence of the second detection resistor R02, so as to achieve automatic adjustment of the output driving mode of the power supply driving module 101.

The above is an example illustrating whether the second detection resistor R02 of the identification module 202 of the controllable LED with a single loop is connected. When the load, the controllable LED, has multiple loops, detection of the type of the identification module 202 can be achieved by detecting whether each loop is provided with the second detection resistor R02 by means of loop switching, or by detecting, at detection ends of the power supply control module 102, whether each loop is provided with the second detection resistor R02 respectively by multiple detection ends, and each type of the identification module 202 corresponds to the power supply driving module 101 outputting a corresponding different parameter, so as to achieve automatic adjustment of the output parameter of the power supply driving module 101.

In a second example, for the controllable LED with different driving modes, different resistance values of the second detection resistor R02 serving an identification function represent different identification types, a resistance value or a voltage value or a current value of the second detection resistor R02 of the identified load 20 is detected by the detection end of the power supply control chip 102, according to a detection result, the power supply control module 102 outputs a corresponding control signal to the power supply driving module 101, and after receiving the control signal, the power supply driving module 101 outputs an output driving mode corresponding to the resistor R02 of the identification module 202 with this resistance value.

In the present embodiment, the output driving mode is taken as an example of the output parameter of the power supply driving module 101, and in practical use, the output parameter of the power supply driving module 101 can be replaced by other output parameters to perform self-adjustment.

Embodiment 4

Figure 6:
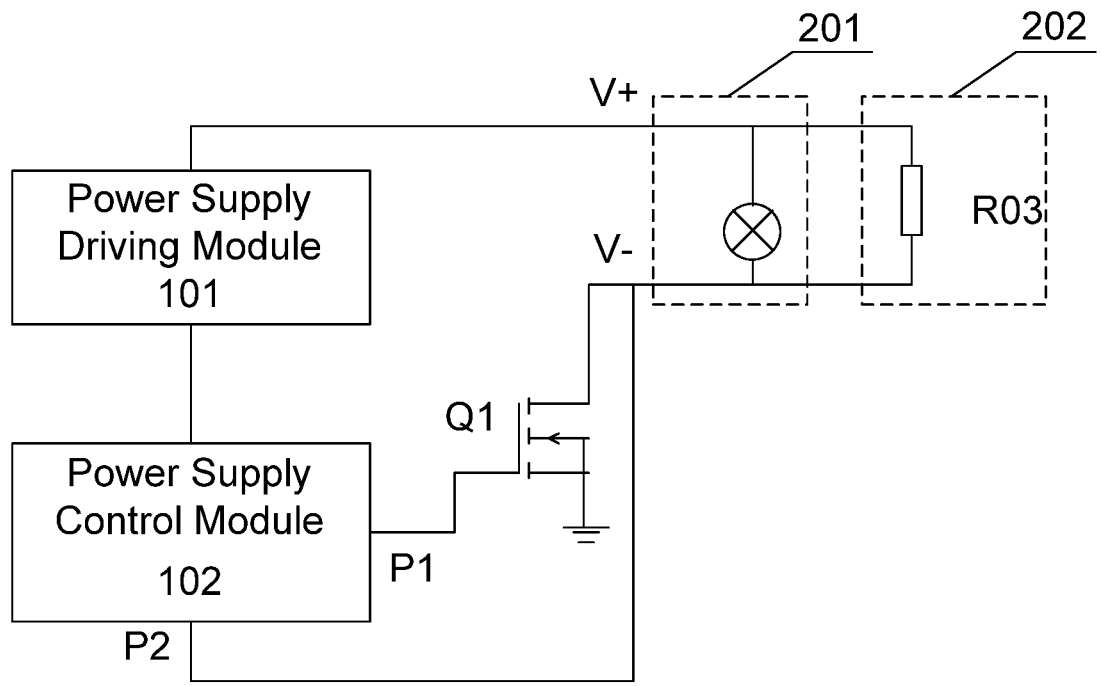
FIG. 6 is a structural schematic diagram of the circuit of the power supply output parameter self-adjusting system of an identified load according to Embodiment 4 of the present disclosure.
Figure 7:
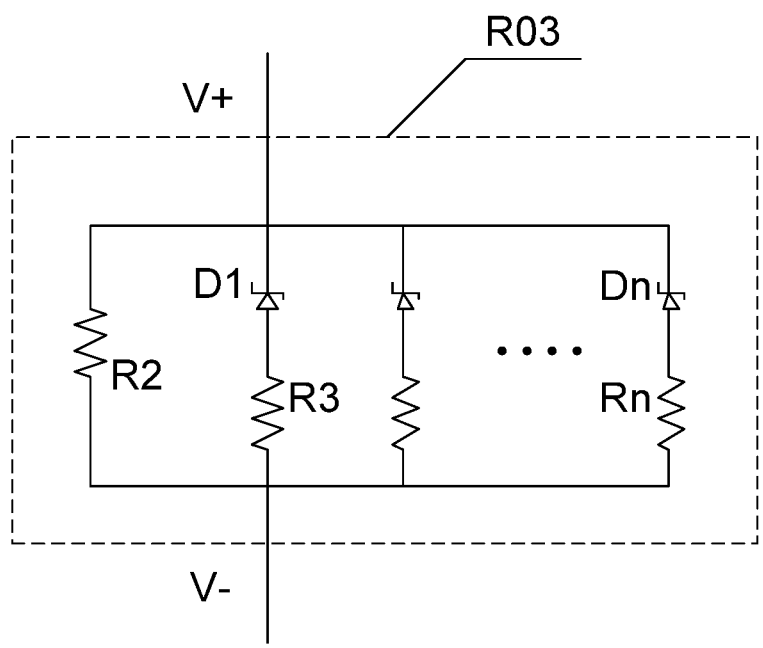
FIG. 7 is a structural schematic diagram of a circuit of a resistor module in the power supply output parameter self-adjusting system of an identified load according to Embodiment 4 of the present disclosure.

Please refer to FIG. 6 and FIG. 7, FIG. 6 is a structural schematic diagram of a circuit of a power supply output parameter self-adjusting system of an identified load according to Embodiment 4 of the present disclosure, and FIG. 7 is a structural schematic diagram of a circuit of a resistor module R03 in FIG. 6. For the power supply output parameter self-adjusting system of an identified load provided in the embodiment of the present disclosure, the identification module 202 includes a resistor module connected in parallel with the load 201; in a second implementation of the resistor module, one end of the resistor module R03 is connected with an input positive end of the load 201, the other end of the resistor R03 is connected with an output negative end of the load 201. The power supply control module 102 further includes a control end P1, a second switch Q1 is provided between the output end of the load 201 and the control end P1 of the power supply control module 102, and a detection end P2 of the power supply control module 102 is connected between the output end of the load 201 and the second switch Q1.

In the present embodiment, the resistor module R03 includes at least one resistor branch, all of the resistor branches are in parallel connection with each other, a first branch includes a second resistor R2, the second branch is connected in parallel with the first branch, the second branch includes a voltage stabilizing diode D1 and a third resistor R3, wherein a positive electrode of the voltage stabilizing diode D1 is connected with a positive electrode of the output end of the power supply driving module 101, a negative electrode of the voltage stabilizing diode D1 is connected with the second resistor R3 and then connected with the output end of the load 201, one end of the second resistor R2 is connected with the positive electrode of the voltage stabilizing diode D1, the other end of the second resistor R2 is connected with the output end of the load 201, an N-th branch includes a voltage stabilizing diode Dn and a resistor Rn, and the N-th branch is connected in parallel with the first branch. For the resistor branches formed by various voltage stabilizing diodes and various resistors above, since each voltage stabilizing diode has a different voltage stabilizing value, voltage values detected by the detection end P2 of the power supply control module 102 are different.

In the present embodiment, a MOS transistor is used as the second switch Q1, and other switching elements also can be used as the second switch Q1 to achieve a controllable switching function.

A working process of the present embodiment is as follows: with different number of resistor branches in the resistor module R03, the voltage values detected by the detection end P2 of the power supply control module 102 are different, that is, the number of the resistor branches in the resistor module R03 is the number of the identification types of the identification module 202, correspondingly, the power supply driving module 101 can output the same number of types of parameters. The control end P1 of the power supply control module 102 controls conduction of the MOS transistor Q1, the detection end P2 of the power supply control module 102 detects a voltage value, the power supply driving module 101 corresponding to this voltage value can output a current m, and the power supply control module 102 sends a control signal to the power supply driving module 101 according to a detection result, such that the power supply driving module 101 outputs a current m.

For example, the controllable LED demands n types of output currents according to the types of the controllable LED. When the resistor module R03 has 1 resistor branch, the power supply driving module 101 outputs a current c1, when the resistor R03 has 2 resistor branches, the power supply driving module 101 outputs a current c2, when the resistor R03 has 3 resistor branches, the power supply driving module 101 outputs a current b3, and when the resistor R03 has n resistor branches, the power supply driving module 101 outputs a current cn. The control end P1 of the power supply control module 102 controls conduction of the second switch Q1. When the detection end of the power supply control module 102 detects that the voltage value of the resistor R03 of the identified load 20 is a value corresponding to 1 resistor branch, according to the detection result, the power supply control module 102 outputs a corresponding control signal to the power supply driving module 101, after receiving the control signal, the power supply driving module 101 outputs to the controllable LED the output current c1 corresponding to the resistor module R03 of the identification module 202, so as to achieve automatic adjustment of the output current of the power supply driving module 101.

In the present embodiment, the output current is taken as an example of the output parameter of the power supply driving module 101, and in practical use, the output parameter of the power supply driving module 101 can be replaced by other output parameters to perform self-adjustment.

To sum up, the present disclosure provides a power supply output parameter self-adjusting system of an identified load, including the variable parameter power supply 10 and the identified load 20, wherein the variable parameter power supply 10 includes the power supply driving module 101 and the power supply control module 102, the identified load 20 includes the load 201 and the identification module 202, after the load 20 is connected with the variable parameter power supply 10, the identification module 202 of the load can be detected by the power supply control module 102, and according to the detection result, automatic adjustment of parameters such as the output power of the power supply driving module 101 is achieved, such that the power supply output parameter self-adjusting system of an identified load is automatically adapted to the load, without adjusting relevant output parameters of the power supply driving module 101 after the load is manufactured, which is simple and convenient; in the power supply output parameter self-adjusting system of an identified load, the load is provided with the identification module 202, then automatic adjustment of parameters such as the output power of the power supply driving module 101 is achieved by adding one identification module 202, without changing the original design, thus solving, all at once, the problem of adjusting the output of the power supply according to the load, saving more labors, thereby decreasing the product costs, and reducing resource wasting.

In the several embodiments provided in the present disclosure, it should be understood that the apparatus and the method disclosed also may be implemented in other manners. The apparatus embodiments described above are merely illustrative, for example, flowchart and the block diagram in the accompanying drawings show system structures, functions, and operations possibly realized by the apparatus, method, and computer program products according to multiple embodiments of the present disclosure. In this regard, each block in the flowchart or the block diagram may represent a part of one module, program segment, or code, and the part of the module, the program segment, or the code contains one or more executable instructions configured to achieve a specified logical function. It also should be noted that in some implementations as substitution, the functions indicated in the blocks also may be carried out in an order different from that indicated in the accompanying drawings. For example, two consecutive blocks practically can be executed substantially in parallel, and they sometimes also may be executed in a reverse order, which depends upon a function involved. It also should be noted that each block in the block diagram and/or in the flowchart, and combinations of the blocks in the block diagram and/or in the flowchart can be realized by a dedicated hardware-based system configured to execute a specified function or action, or can be realized by a combination of dedicated hardware and computer instructions.

Besides, various functional modules in each embodiment of the present disclosure can be integrated together to form one independent portion, and it is also feasible that each module exists independently, or that two or more modules are integrated to form one independent portion.

The above-mentioned are merely for preferred embodiments of the present disclosure, rather than being used to limit the present disclosure. For one skilled in the art, various modifications and changes may be made to the present disclosure. Any amendments, equivalent replacements, improvements, and so on, within the spirit and principle of the present disclosure, should be covered by the scope of protection of the present disclosure. It should be noted that similar reference signs and letters represent similar items in the following accompanying drawings, therefore, once a certain item is defined in one accompanying drawing, it is not needed to be further defined or explained in subsequent accompanying drawings.

The above-mentioned are merely embodiments of the present disclosure, but the scope of protection of the present disclosure is not limited thereto, and changes and substitutions that may be easily envisaged by a person skilled in the present art within the technical scope disclosed in the present disclosure should fall within the scope of protection of the present disclosure. Therefore, the scope of protection of the present disclosure should be based on the scope of protection of the claims.

What is claimed is:

1. A power supply output parameter self-adjusting system of identified load, comprising a variable parameter power supply and the identified load, wherein the variable parameter power supply is electrically connected with the identified load, the variable parameter power supply comprises a power supply driving module and a power supply control module, the power supply driving module is electrically connected with the power supply control module, and the identified bad comprises a load and an identification module, wherein the power supply control module comprises a detection end and a signal output end, the detection end is connected with the identification module, the signal output end is connected with the power supply driving module, and an output end of the power supply driving module is connected with the load and the identification module respectively;

the power supply control module is configured to detect the identification module, and send a control signal to the power supply driving module according to a detection result, and the power supply driving module is configured to output a corresponding parameter according to the control signal;

the identification module comprises a resistor module connected in parallel with the load and one end of the resistor module takes electricity via the power supply control module;

the load comprises an input positive end and an output negative end, one end of the resistor module is connected with the input positive end of the load, the other end of the resistor module is connected with the output negative end of the load, the input positive end of the load is further connected with a positive electrode of the output end of the power supply driving module, the power supply control module further comprises a control end, the output negative end of the load is further connected with the control end, a second switch is provided between the output negative end of the load and the control end, and the detection end of the power supply control module is connected between the output negative end of the load and the second switch; and the resistor module comprises a first branch and a plurality of second branches, the first branch is connected in parallel with the plurality of second branches, all of the second branches are connected in parallel with each other, the first branch comprises a second resistor, each one of the plurality of second branches comprises a third resistor and a voltage stabilizing diode, a positive electrode of the voltage stabilizing diode is connected with the positive electrode of the output end of the power supply driving module, and a negative electrode of the voltage stabilizing diode is connected with the third resistor.

2. The power supply output parameter self-adjusting system of an identified load according to claim 1, wherein the load is a controllable LED and configured for lighting and/or signal transmission, an input positive end of the controllable LED is connected with a positive electrode of an output end of the power supply driving module, and an output negative end of the controllable LED is connected with a negative electrode of the output end of the power supply driving module.

* * * * *